July 28, 1931.  B. FOCO  1,816,673
SPRING WASHER
Filed Jan. 11, 1929
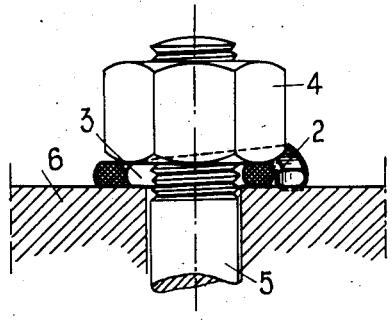
Fig. 1
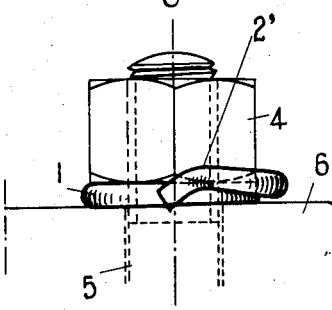
Fig. 2
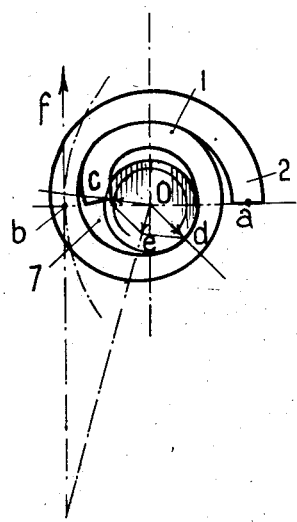
Fig. 3
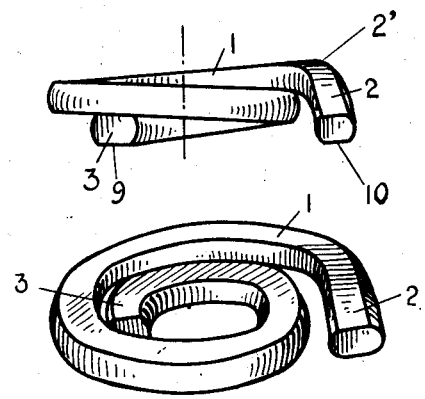
Fig. 4
Fig. 5
Inventor
Bruno Foco
by his Attorney Patented July 28, 1931

1,816,673

UNITED STATES PATENT OFFICE

BRUNO FOCO, OF TURIN, ITALY

SPRING WASHER

Application filed January 11, 1929, Serial No. 331,832, and in Italy January 24, 1928.

This invention relates to means for locking nuts against becoming loose, and more particularly the invention refers to improvements in washers of the spring type adapted to generate an axially directed force against the nut thereby causing a frictional resistance to take place between the nut and the bolt preventing the nut from becoming loose under the influence of vibrations.

Spring washers are not in a generic sense new, washers exerting a spring action against the nut having been in use for a number of years. However, these washers, which are generally produced by longitudinally slitting a coil made of flat elastic wire so as to divide it into a number of individual slit coils, each having its two ends spread apart in an axial direction, have not proved entirely satisfactory in practice.

The chief objection which may be raised against the use of spring washers of the ordinary kind is that while they are fairly effective at first, they lose their elasticity within a relatively short time due to the fact that they are completely flattened between the nut and the underlying surface.

Other means such as pins and cotter pins are therefore still widely used for securing nuts in position; but these devices are in their turn open to the objection that they complicate the process of manufacture of bolts and nuts and are difficult of insertion and removal, so that their use requires an expenditure of time and labor which results in delays and inconvenience as well as in a proportionate increase in costs.

The primary object of this invention is to provide a spring washer of a novel and improved construction, affording the convenience and speed of application of an ordinary spring washer and at the same time insuring a locking action which is practically as positive as that obtained by means of pins or cotter pins.

Another object is to provide a device of the class specified, of a relatively simple construction making it possible to produce the same in quantities at comparatively low cost.

A further object is to provide a spring washer, the construction of which is such as to cause a tangential locking action against the surface of the bolt upon which it is being used, thus preventing the rotation of the bolt when the nut is being tightened in position.

Other objects and advantages of the present invention will more fully appear as the description proceeds and will be set forth and claimed in the appended claims.

One of the embodiments of my invention is illustrated in the accompanying drawings in which:—

Fig. 1 is a cross section of a member held in position by a bolt and a nut, showing in section my improved spring washer inserted between the nut and the outer surface of said member;

Fig. 2 is a view in elevation thereof;

Fig. 3 is a plan view of my improved washer illustrating its action against the threaded stem of a bolt;

Fig. 4 is a front elevation of said washer; and

Fig. 5 is a view in perspective of the same.

My improved spring washer essentially consists of a spirally wound length of metal bar, preferably steel, extending for about one coil and a half; said spiral structure also being helicoidal in character, being formed with an axial pitch which provides the necessary elasticity in an axial direction. Furthermore in the preferred form, the outer end of the spiro-helicoidal washer thus produced is bent inwardly towards and practically to reach the plane of the inner end of the spiral.

Thus referring to Figs. 3, 4 and 5, it will be seen that the washer consists of a spiro-helicoidally wound bar 1, substantially extending for the length of one and one half coils, the outer end 2 of said bar being bent inwardly towards the plane of the inner end 3 forming a bend 2' at the point of bending. The two ends 2, 3, are cut sharp so that their lower edges shown respectively at 9, 10, have a tendency to indent the surface against which they are pressed and to exert an anchoring action against the rotation of the washer.

One of the features of the device is that its inner diameter is somewhat larger than the diameter of the bolt in connection with which it is used.

By virtue of this construction, when the nut 4 is tightened upon bolt 5, compressing the washer against the surface of its seat 6, the lower edge 10 of outer end 2, which is external of the periphery of the nut, will become indented into surface 6 as shown in Fig. 2 and will prevent the possibility of any further rotation of the washer about the axis of the bolt. In a similar manner, lower edge 9 of inner end 3 also frictionally engages the surface 6 and prevents the rotation of the washer when the nut is being removed.

As soon as edge 10 of outer end 2 has engaged surface 6 in the manner shown in Fig. 2, the washer will become subjected to the tangential force exerted against its upper surface by the nut which is still being rotated. The washer being retained in $a$, as shown in Fig. 3, we may assume that the tangential force exerted by the nut is exerted in $b$, the moment of said force $f$ being therefore represented by $f.ab$. The washer will therefore be urged to rotate about the point $a$ as a fulcrum until its inner surface comes to bear against the circumferential surface of the bolt in the point $d$.

After this, the washer will be unable to rotate further and therefore it will gradually become deformed and flattened in an axial direction, until it reaches the position shown in Figs. 1 and 3.

In this position the inner edge $c$ of end 3 bears against the surface of the bolt and therefore the force $f$ applied about the arm $ab$ will generate reactions exerted by the bolt against the washer in radial directions at the points of contact $c$, $d$, as the arrows in Fig. 3 indicate. The direction of the resultant $e$ of these reactions indicates that the ultimate result of the applied moment $f.ab$ is to generate a reaction tending to cause the bolt to become wedged in the clearance space 7 adjacent the inner end 3 of the washer. Therefore edge $c$ tightly bears against a portion of the surface of the belt which is generally still threaded.

As the nut is further tightened, this action becomes intensified and causes edge $c$ of end 3 to become indented into the surface of the bolt 5. This will therefore make it impossible for the bolt to follow the rotation of the nut because the rotation of the bolt with respect to the washer is prevented at $c$ and the rotation of the washer with respect to surface 6 is prevented at 10.

As stated before, the deflection of the outer end 2 towards the plane of the inner end 3 results in the formation of a bend 2′ which eventually assists the frictional resistance generated by the axial pressure exerted by the washer in preventing the nut from becoming loose.

It will be observed that when the nut is tightened in position, the major portion of the washer is flattened while it has originally a helicoidal outline as shown in Fig. 4.

However, the radius of the surface of the outer end 2 at the point of bending 2′ is about equivalent to the maximum radius of the nut; so that when one of the edges of the nut is about to reach said portion 2″ it must depress the bent portion of the washer in order to pass beyond said point. As soon as the edge of the nut has traveled beyond point 2′, the bent end of which was temporarily deformed resumes its normal outline and effectively prevents the spontaneous loosening of the nut. That this action occurs, is confirmed by the fact that when the nut is unscrewed by means of a wrench, for instance, each time that one of its edges is about to reach the bent portion 2′, the resistance to the loosening of the nut, suddenly increases in a material way.

By virtue of this special construction therefore, my improved washer possesses the following main advantages.

1. The washer cannot follow the rotation of the nut due to one of its edges becoming indented into the surface against which it is being pressed.

2. The bolt is prevented from turning due to the wedging action taking place between said bolt and the inner end of the washer.

3. The spontaneous loosening of the nut which might be due to vibrations or other causes is effectively prevented not only by virtue of the elastic reaction that the bent portion of the washer produces against the nut but also and more effectively by the frictional resistance that the outer end of the washer exerts against the periphery of the nut.

The bar used for the production of the washer shown in the drawings has an elipsoidal section with two flattened sides, but it is obvious that bar stock having different sections such as square, rectangular or circular may be used.

Washers made in accordance with my invention maintain their elasticity practically unimpaired so that they can be used and re-used time and again; this being due to the fact that only a part of the structure is flattened under the nut, while the other part which is bent towards and bears against the underlying surface retains its curved outline practically unchanged.

The invention may be modified in its various details without departing from the inventive idea; the drawings will therefore be understood as being intended for illustrative purposes only and not in a limiting sense; I accordingly reserve to myself the right to carry my invention into practice in all those ways and manners which may enter, fairly, into the scope of the appended claims.

I claim:

1. A spring washer having a spiro-helicoidal shape substantially from one of its ends to the other, and being upwardly directed from its inner towards its outer end, its maximum inner radius being about equal to the maximum radius of a nut in connection with which the washer is to be used, said washer having a substantially uniform section throughout its length, part of the outer end of said washer projecting above the lower surface of said nut at its points of minimum diameter, and being adapted to exert a frictional action against the side surface thereof.

2. A spring washer having a spiro-helicoidal shape, the inner edge of its inner end being adapted to bite into the surface of the bolt stem about which the washer is inserted.

3. A spring washer having a spiro-helicoidal shape, an edge of at least one of its ends being adapted to bite into the surface towards which a nut in connection with which the washer is to be used, is to be pressed when said nut is turned towards said surface, the inner edge of its inner end being adapted to bite into the surface of the bolt stem about which the washer is inserted.

4. A spring washer having a spiro-helicoidal shape, the edges of both of its ends being adapted to bite into the surface against which the washer is being pressed when inserted between a nut and said surface, the inner edge of its inner end being adapted to bite into the surface of the bolt stem about which the washer is inserted.

5. A spring washer having a spiro-helicoidal shape upwardly directed from its inner towards its outer end, the inner radius of its outer end being about equal to the maximum radius of a nut in connection with which the washer is to be used, said outer end being deflected towards a plane at right angles to the axis of said washer, passing through the lower edge of the other end thereof, at a point the inner radius of which is somewhat smaller than the maximum radius of said nut, the edges of both of its ends being cut in a substantially radial direction and cut adapted to bite into the surface against which the washer is being pressed when inserted between a nut and said surface.

6. A spring washer having a spiro-helicoidal shape upwardly directed from its inner towards its outer end, the inner radius of its outer end being about equal to the maximum radius of a nut in connection with which the washer is to be used, said outer end being deflected towards a plane at right angles to the axis of said washer, passing through the lower edge of the other end thereof, at a point the inner radius of which is somewhat smaller than the maximum radius of said nut, the edges of both of its ends being cut in a substantially radial direction and being adapted to bite into the surface against which the washer is being pressed when inserted between a nut and said surface, the inner edge of its inner end being adapted to bite into the surface of the bolt stem about which the washer is inserted.

7. A spring washer having a spiro-helicoidal shape substantially from one of its ends to the other, its minimum inner diameter being slightly larger than the stem diameter of a bolt in connection with which the washer is to be used, the inner edge of its inner end being adapted to bite into the surface of the bolt stem about which the washer is inserted.

8. A spring washer having a spiro-helicoidal shape substantially from one of its ends to the other, its minimum inner diameter being slightly larger than the stem diameter of a bolt in connection with which the washer is to be used, the inner edge of its inner end being adapted to bite into the surface of the bolt stem about which the washer is inserted, said inner end also having an edge adapted to bite into the surface against which the washer is being pressed in an axial direction, the outer end of said washer having its inner radius about equal to the maximum radius of a nut in connection with which the washer is to be used, said outer end being deflected towards and having an edge adapted to bite into the said last mentioned surface.

9. A spring washer having a spiro-helicoidal shape substantially from one of its ends to the other, its minimum inner diameter being slightly larger than the stem diameter of a bolt in connection with which the washer is to be used, the inner edge of its inner end being adapted to bite into the surface of the bolt stem about which the washer is inserted, said inner end also having an edge adapted to bite into the surface against which the washer is being pressed in an axial direction, the outer end of said washer having its inner radius about equal to the maximum radius of a nut in connection with which the washer is to be used, said outer end being deflected towards the said last mentioned surface at a point the inner radius of which is substantially equivalent to the maximum radius of said nut, and having an edge adapted to bite into said surface.

10. A spring washer having a spiro-helicoidal shape, the inner edge of the inner end of said washer being adapted to bite into the surface of said bolt, and its outer end being deflected towards, and being adapted to bite into the surface against which said washer is pressed when a nut is tightened upon said bolt.

11. A spring washer consisting of a wire coil having a spiro-helicoidal shape, the inner edge of the inner end of said washer being adapted to bite into the surface of said bolt, and its outer end being deflected towards, and being adapted to bite into the surface against which said washer is pressed when a nut is tightened upon said bolt, the length of said coil being not less than one and a half turns.

12. A spring washer consisting of a wire coil having a spiro-helicoidal shape, the inner edge of the inner end of said washer being adapted to bite into the surface of said bolt, and its outer end being deflected towards, and being adapted to bite into the surface against which said washer is pressed when a nut is tightened upon said bolt, the length of said coil being subtantially one and a half turns.

13. A spring washer having a spiro-helicoidal shape, the inner edge of the inner end of said washer being adapted to bite into the surface of said bolt, and its outer end being deflected towards the surface against which said washer is pressed when a nut is tightened upon said bolt, said outer end being cut with a substantially radially directed sharp edge adapted to bite into said surface.

BRUNO FOCO.